Figure 1:
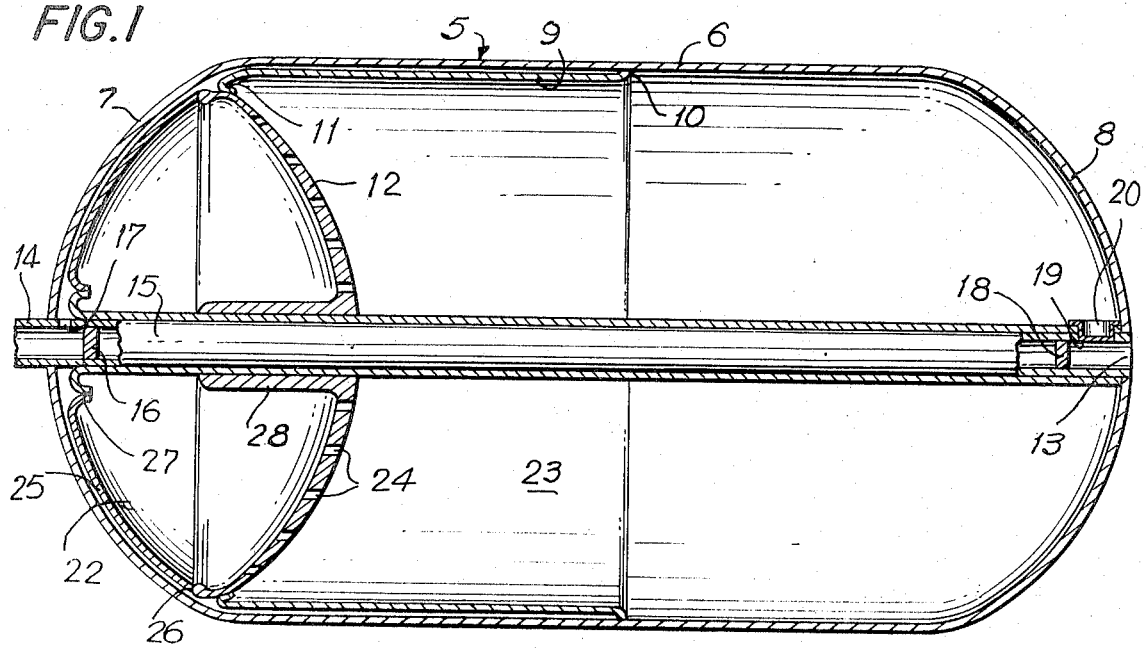

United States Patent [19]

Hosek

[11] 3,847,307
[45] Nov. 12, 1974

[54] POSITIVE EXPULSION DEVICE FOR FLUIDS

[75] Inventor: William S. Hosek, Mount Tabor, N.J.

[73] Assignee: Thiokol Chemical Corporation, Bristol, Pa.

[22] Filed: Oct. 10, 1966

[21] Appl. No.: 586,008

[52] U.S. Cl. ............................................ 222/386.5
[51] Int. Cl. ................................................ B67d 5/54
[58] Field of Search .......... 222/95, 386.5; 158/50.1; 239/323

[56] References Cited
UNITED STATES PATENTS 2,970,452  2/1961  Beckman et al. ............. 222/386.5 X
3,180,089  4/1965  Dodge ............................. 60/260 X Primary Examiner—Verlin R. Pendegrass

[57] ABSTRACT

The disclosure relates to a tank for a liquid, such as a propellant for a rocket motor, having a bell-shaped end, a piston connected to one end of a cylindrical rolling diaphragm of relatively flexible material and to the end of a second rolling diaphragm of a shape to conform to the bell-shaped end of the tank, and said piston having perforations so that an actuating pressure fluid applied to the side of the second diaphragm will deform it to conform to the contour of the piston and displace any liquid between it and the piston through the perforations in the piston.

5 Claims, 3 Drawing Figures

PATENTED NOV 12 1974

3,847,307

INVENTOR.
WILLIAM S. HOSEK

BY

Curtis, Morris & Safford

ATTORNEYS

POSITIVE EXPULSION DEVICE FOR FLUIDS

The present invention relates to fluid storage and discharge devices and more particularly to an improved apparatus for positively expelling fluid from a tank.

Devices of this type have heretofore been proposed as having a "rolling diaphragm" for positively discharging fluids from a tank. The rolling diaphragm in such devices comprises a cylindrical sleeve of a thin flexible material forming a lining on the wall of a tank with one end attached thereto and the opposite end forming or attached to a piston slidable in the tank. Such devices are operated by supplying a motive fluid under pressure between the piston and the end of the tank to actuate the piston along the tank and expel fluid therefrom at the end opposite the one to which the pressure fluid is supplied. During such movement of the piston the flexible diaphragm rolls back on itself. Such a construction has the advantage of hermetically sealing the fluid in a tank and avoids the use of ring type seals on a piston as well as encapsulating the fluid from contact with the walls of the tank which may be composed of a material incompatible with the fluid.

However, such rolling diaphragms have certain disadvantages as, for example, requiring the piston to have the same shape as the end wall of the tank it approaches. If the piston does not have the same shape as the end wall of the tank, it will not positively expel all of the liquid between it and the tank wall. Also, if the end wall adjacent the piston does not conform to the shape of the piston, the space therebetween will be wasted. Thus, the shape of the piston limits the design of the tank in which it is used and this piston shape may not conform to the space available as, for example, in a rocket engine.

One of the objects of the present invention is to provide a rolling diaphragm of improved construction which adapts it for use with tanks having end structures which project outwardly at opposite ends of the tank.

Another object is to provide a rolling diaphragm construction which adapts fluid on one side of a piston to be displaced through the piston and thereafter be actuated by the piston to expel all of the fluid from the tank.

Still another object is to provide an improved rolling diaphragm construction of the type indicated which is of relatively simple and compact construction, economical to manufacture and one which is reliable in operation.

Figure 2:
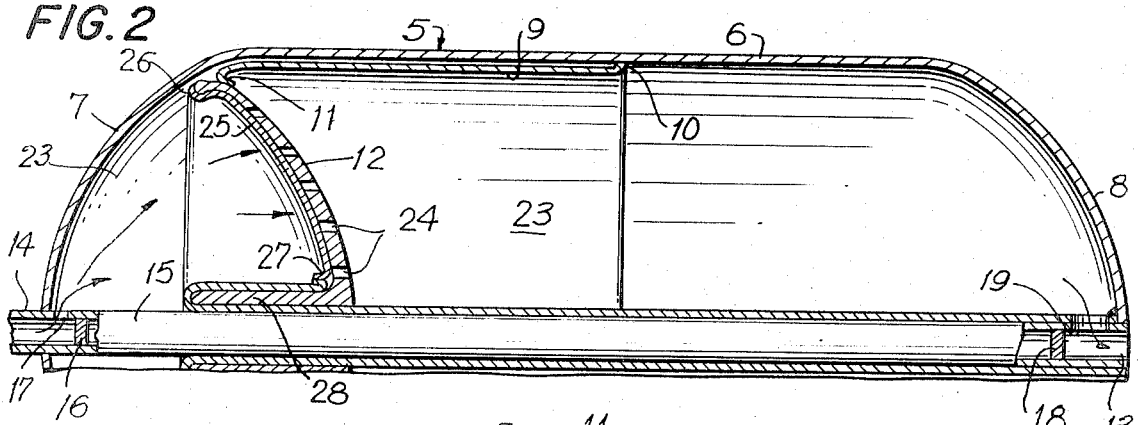
Figure 3:
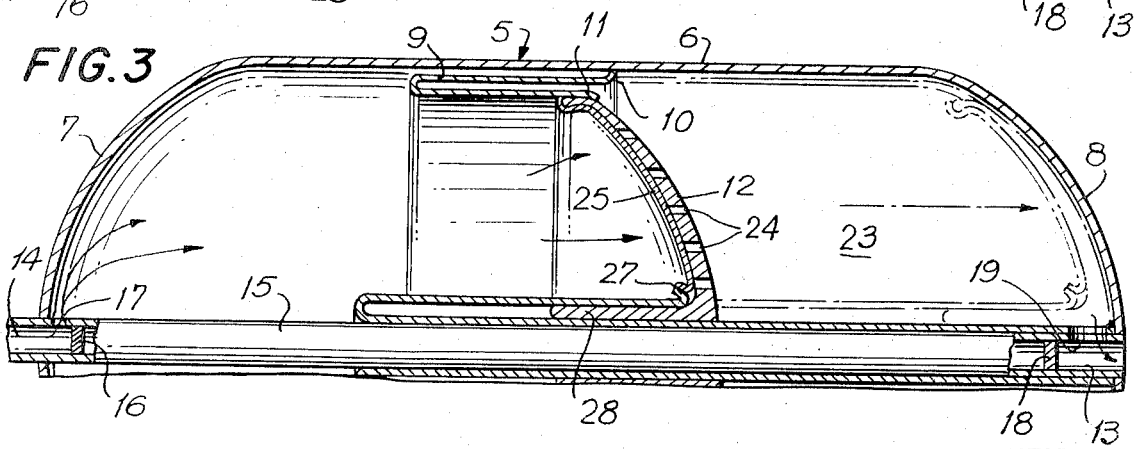

These and other objects will become more apparent from the following description and drawing in which like reference characters denote like parts throughout the several views. It is to be expressly understood, however, that the drawing is for the purpose of illustration only and is not a definition of the limits of the invention, reference being had for this purpose to the appended claims. In the drawing:

FIG. 1 is a side elevational view of a tank in section and showing the improved rolling diaphragm construction of the present invention when the tank is completely filled with the fluid being stored;

FIG. 2 is a view similar to FIG. 1 showing the diaphragm at the forward or left hand side of the piston rolled back on itself to expel the fluid through the piston and seal the side of the piston to which motive fluid is applied; and FIG. 3 is a view similar to FIG. 1 showing the piston actuated along the tank and the diaphragm at the opposite or rearward side of the piston being rolled back on itself.

For purposes of illustration, the present invention is shown applied to a tank 5 having a central cylindrical section 6 with end bells 7 and 8 illustrated in the form of spherical segments projecting outwardly in opposite directions. It will be understood, however, that the end closures 7 and 8 of the tank 5 may have any symmetrical shape produced by revolving a generatrix about the axis of the cylindrical tank section 6, or of any other shape to which a piston may be made to conform. Tank 5 may be completely filled with fluid such as a liquid propellant when the tank is used in a rocket engine, and the fluid hermetically sealed therein.

The fluid is expelled from the tank by a rolling diaphragm 9 constructed of a flexible material, such as sheet metal, and having one end 10 attached to the wall of the tank and its opposite end 11 connected to the outer periphery of a piston 12. In the illustrated embodiment, the end of the diaphragm 9 opposite the piston 12 is connected to the cylindrical wall portion 6 of the tank intermediate its ends, but it will be understood that the diaphragm may line the entire wall of the tank to an outlet opening 13 in the end bell 8. The diaphragm 9 then completely covers the tank wall which may be composed of a material of great strength but incompatible with the fluid being stored. The diaphragm, on the other hand, would comprise a material which is compatible with the fluid stored in the tank.

A motive fluid may be supplied to the space between the piston 12 and adjacent end bell through an inlet 14 to actuate the piston from the position illustrated in FIG. 1 to the positions illustrated in FIGS. 2 and 3 to expel the fluid from the tank 5 through the outlet 13. The piston 12 may extend across the entire area of the tank, but in the illustrated embodiment it is of annular form and mounted to slide on a tube 15 extending axially throughout the length of the tank. The outlet 13 for stored fluid and the inlet 14 for pressure medium are formed by the projecting ends of tube 15. To this end, the tube 15 has a plug 16 inside the tank 5 adjacent the end bell 7 and a hole 17 between the plug and end bell. Similarly a plug 18 is provided in the tube 15 adjacent end bell 8 and a hole 19 is provided between the plug and end bell 8 and opening into the outlet 13. The hole 19 is normally closed by a sealing cup 20 which is automatically blown out when the pressure fluid is applied. With a conventional construction in the tank 5, the rearward face of the piston 12 must conform to the contour of the end bell 8 to expel all of the fluid from the tank. But with such a construction, the arcuate piston 12 and end bell 7 of the tank 5 form a lenticular space 22 therebetween which would be wasted.

In accordance with the present invention the piston 12 has perforations 24 and a second rolling diaphragm 25 to displace fluid from the space 22 at the front of the piston to the space 23 between the piston and end bell 8. The second rolling diaphragm 25 has one end 26 connected to the outer periphery of the piston 12 and then extends across the inner surface of the end bell 7 closely adjacent thereto to provide a lining for the end bell. The diaphragm 25 then projects rearwardly as a sleeve on the axial tube 15 to the end bell 8. In the illustrated embodiment the diaphragm 25 is made in separate parts which are joined at the annular seam 27. To facilitate operation of the diaphragm 25 the piston 12 has a skirt 28 projecting from it toward end bell 7 for one half the distance therebetween. Skirt 28 thus constitutes a hub for the piston 12 which slides on the tube 17. The second diaphragm 25 is also made of a flexible material, such as sheet metal, but of a thinner stock to adapt it to flex at less pressure than the diaphragm 9. One form of the invention having now been described in detail, the mode of operation is next explained.

When a pressurizing fluid is supplied through the inlet 14 between the diaphragm 25 and end bell 7 of the tank, the diaphragm flexes and rolls back on itself from the position illustrated in FIG. 1 to that illustrated in FIG. 2. Such rolling movement of the diaphragm 25 propels the fluid from the space 22 through the perforations 24 in the piston 12 and into the space 23 until the diaphragm engages and completely covers the forward face of the piston as illustrated in FIG. 2. The movement of the diaphragm 25 is controlled by the forwardly projecting skirt 28 of piston 12 over which it folds so that it will exactly fit the outer periphery of the skirt and forward face of the piston. As soon as the fluid in the tank 5 becomes pressurized it blows the cup 20 from the opening 19 and an amount of fluid corresponding to that displaced by the diaphragm 25 is discharged through the outlet port 13.

The diaphragm 25 then acts as a covering to seal the forward face of the piston 12 to render it imperforate. The motive fluid then acts on the piston and moves it from the position shown in FIG. 2 to what is shown in FIG. 3. As the piston continues to move toward the end bell 8 it expels the fluid from the space 23 in the tank 5 and through the outlet 13. During such movement of the piston 12 the outer and inner walls of the diaphragm 9 roll back on themselves as shown in full lines and dash lines in FIG. 3 to completely displace all of the fluid in the tank 5.

It will now be observed that the present invention provides a rolling diaphragm arrangement adapted for use with tanks having oppositely projecting end bells. It will also be observed that the present invention provides an arrangement for displacing fluid from one side of the piston to the other and then from the tank and thereafter expels the fluid at the rearward side of the piston from the tank. It will still further be observed that the present invention provides an improved device for expelling fluids from tanks which are of simple and compact construction, economical to manufacture and one which is reliable in operation.

While a single embodiment of the invention is herein illustrated and described, it will be understood that changes may be made in the structure and arrangement of elements without departing from the spirit or scope of the invention. Therefore, without limitation in this respect, the invention is defined by the following claims.

I claim:

1. In an apparatus for positively expelling fluid from a closed vessel and of the type having a rolling diaphragm with a cylindrical wall of a relatively flexible material, a piston at one end of the diaphragm of a shape to conform to one end of the vessel and means for supplying fluid under pressure to one side of the piston, that improvement which comprises perforations in the piston so that fluid may flow therethrough, a second rolling diaphragm connected to the outer periphery of the piston of a shape to conform to the opposite end of the vessel, and means to control the rolling of the second diaphragm to engage the adjacent side of the piston and form an imperforate lining thereon so that the pressure fluid thereafter acts on the piston to move it bodily from one end of the tank to the other.

2. In an apparatus for positively expelling fluid from a closed vessel having ends projecting outwardly in opposite directions, a perforate piston in said vessel adjacent one end and having a shape conforming to the shape of the opposite end of the vessel, a first rolling diaphragm at one side of the piston having a cylindrical wall of a flexible material and connected at its opposite ends to the outer periphery of the piston and wall of the vessel, respectively, a second rolling diaphragm at the other side of the piston which conforms to the shape of the adjacent end of the vessel and has its opposite ends connected to the outer periphery of the piston and wall of the vessel, respectively, and means for supplying fluid under pressure between the second diaphragm and end of the vessel to roll the second diaphragm against a face of piston to seal the perforations therein and thereafter move the piston toward the opposite belled end of the vessel and roll the first mentioned diaphragm back on itself.

3. An apparatus for positively expelling fluid in accordance with claim 2 in which the vessel is a cylindrical tank having belled ends and the piston has an arcuate shape of substantially the same radius as the belled ends of the vessel, the second diaphragm having an arcuate portion of the same radius as the piston and conforming to the shape of the belled end, and an axial sleeve extending from the piston for a distance equal to one-half the axial distance between the belled end of the tank and inner periphery of the piston.

4. An apparatus for positively expelling fluid in accordance with claim 2 in which the tank has an axial tube, the first mentioned diaphragm lining at least a portion of the wall of the tank, and the second diaphragm lining the end bell of the tank and extending through the piston and along the tube to the opposite end of the tank whereby the second mentioned diaphragm rolls back against the forward side of the piston after which the first and second diaphragms roll back on themselves at the inner and outer peripheries of the piston as it moves toward the opposite belled end of the tank.

5. An apparatus for positively expelling fluid in accordance with claim 2 in which the ends of the tanks are spherical segments forming end bells, the piston being in the form of a spherical segment having a radius corresponding to the radius of the end bells, the first diaphragm lining the outer periphery of the tank, the second diaphragm having a shape corresponding to the spherical segment of the end bell and piston and adapted to reverse itself from a position where it closely fits the end bell to a position where it closely fits the forward side of the piston.

* * * * *